United States Patent [19]
Wycech

[11] Patent Number: 6,003,274
[45] Date of Patent: Dec. 21, 1999

[54] LIGHTWEIGHT LAMINATE REINFORCING WEB

[75] Inventor: Joseph S. Wycech, Grosse Pointe Woods, Mich.

[73] Assignee: Henkel Corporation, Gulph Mills, Pa.

[21] Appl. No.: 09/236,750

[22] Filed: Jan. 25, 1999

Related U.S. Application Data

[60] Provisional application No. 60/074,720, Feb. 13, 1998.
[51] Int. Cl.$^6$ .............................. E04C 2/26; B62D 25/00
[52] U.S. Cl. ........................ 52/232; 52/309.8; 52/309.9; 52/731.1; 52/731.6; 52/733.3; 52/735.1; 52/745.19; 296/188; 428/319.1
[58] Field of Search ................................ 52/232, 730.1, 52/730.4, 730.5, 730.6, 731.2, 731.3, 731.6, 732.1, 732.2, 733.3, 735.1, 745.19, 309.8, 309.9, 731.1; 296/188; 428/319.1

[56] References Cited

U.S. PATENT DOCUMENTS

| | | |
|---|---|---|
| 2,690,987 | 10/1954 | Jeffries et al. . |
| 3,802,948 | 4/1974 | Noma . |
| 4,399,174 | 8/1983 | Tanaka et al. . |
| 4,495,240 | 1/1985 | McCarthy . |
| 4,585,683 | 4/1986 | Curnow . |
| 4,830,908 | 5/1989 | Nakajima et al. . |
| 4,861,097 | 8/1989 | Wycech . |
| 4,901,500 | 2/1990 | Wycech . |
| 4,922,596 | 5/1990 | Wycech . |
| 4,978,562 | 12/1990 | Wycech . |
| 5,151,327 | 9/1992 | Nishiyama et al. . |
| 5,575,526 | 11/1996 | Wycech . |
| 5,755,486 | 5/1998 | Wycech . |
| 5,884,960 | 3/1999 | Wycech . |
| 5,888,600 | 3/1999 | Wycech . |

*Primary Examiner*—Robert Canfield
*Attorney, Agent, or Firm*—Ernest G. Szoke; Wayne C. Jaeschke; Stephen D. Harper

[57] ABSTRACT

A lightweight structural reinforcement spans a space in a structural member. The reinforcement functions as a web and has a metal plate, a layer of foam and a thin, metal reinforcement selectively positioned at the mid-portion of the reinforcement. Unexpanded foam at the end portions of the plate serve as a n adhesive to bond the reinforcement to the structural member being reinforced.

31 Claims, 3 Drawing Sheets

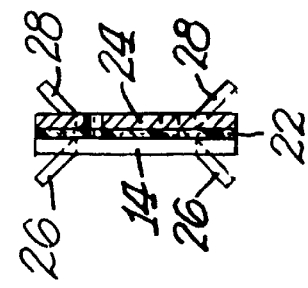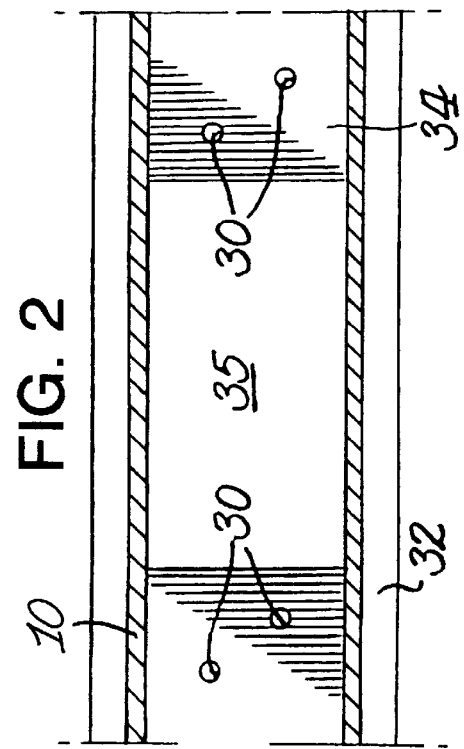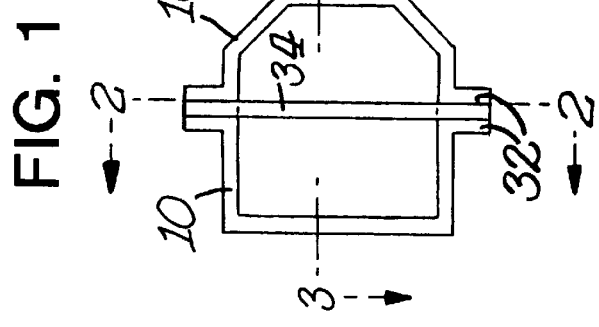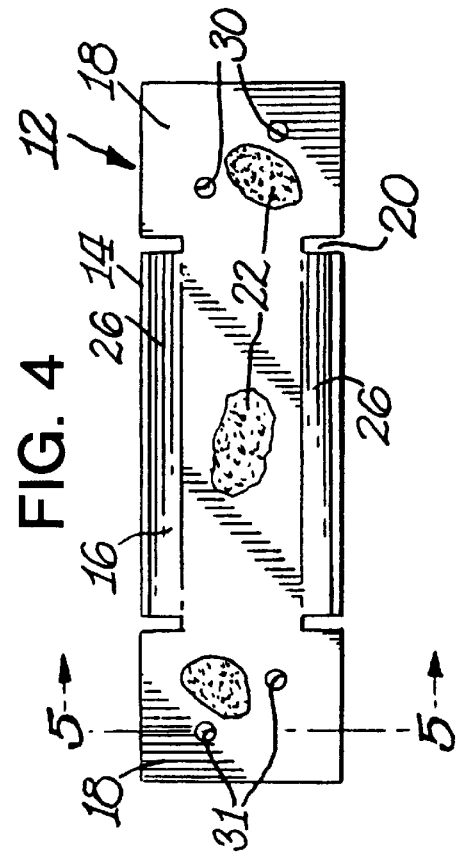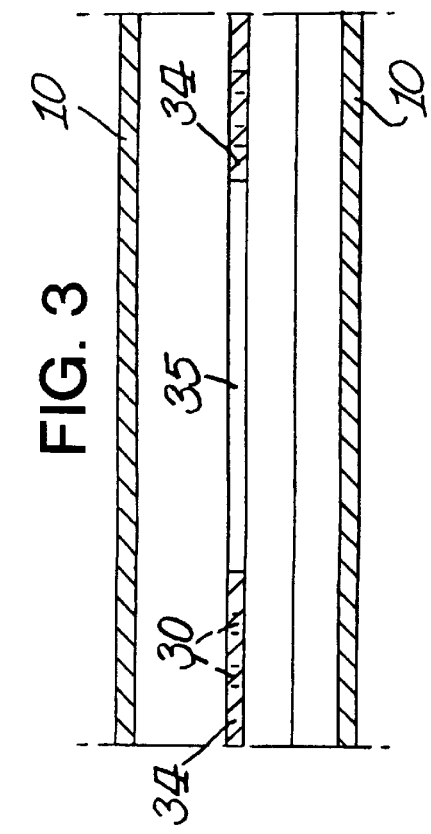

LIGHTWEIGHT LAMINATE REINFORCING WEB

CROSS-REFERENCE TO RELATED APPLICATION

The application is based upon provisional application Ser. No. 60/074,720, filed Feb. 13, 1998.

TECHNICAL FIELD

The present invention relates generally to methods and apparatus for reinforcing structural members and, more specifically, relates to reinforcement webs for hollow structural members.

BACKGROUND OF THE INVENTION

In the automotive industry, there is a need for lightweight, high-strength structural members. Typically, automotive structures such as rails, pillars and the like are hollow to conserve mass while still providing high strength. Although structural members with these desirable characteristics can be readily obtained through the use of various exotic metal alloys, high-strength alloys are generally cost prohibitive in automotive applications.

Although filling the entirety of a section with plastic foam does significantly increase section stiffness (at least when high-density foams are utilized), this technique may also significantly increase mass and thus part weight, which, as stated, is an undesirable feature in most applications. In addition, filling a section entirely with foam can contribute significantly to cost and often creates an unwanted heat sink. Although increasing the metal gauge of a section or adding localized metal reinforcements will increase stiffness, as the metal thickness increases, it is more difficult to form the part due to limitations of metal forming machines.

A number of approaches have been proposed for dealing with the problem of reinforcing hollow sections subjected to buckling loads as alternatives to a high-cost alloys, thick gauge metals and large foam cores. For example, a reinforcement insert for a structural member comprising a precast reinforcement has been proposed wherein the reinforcement is formed of a plurality of pellets containing a thermoset resin and a blowing agent. The precast member is expanded and cured in place in the structural member. A composite tubular door beam reinforced with a syntactic foam core localized at the midspan of the tube has also been described in the art. The resin-based core occupies not more than one-third of the bore of the tube.

Tube-in-tube structures having high stiffness-to-mass ratios have also been proposed in which two nested tubes have a layer of foam disposed in the annulus between the tubes. A local reinforcement in the nature of a foamable resin disposed on a drop-in carrier has also been described. The carrier is placed in the channel of a hollow structural member and the resin is expanded.

Accordingly, low-cost techniques for reinforcing hollow sections without significantly increasing mass are quite desirable. Further, it is also desirable to provide methods of reinforcing existing hollow sections which do not require any fundamental design change to the member. The present invention provides hollow sections which have increased strength with moderate increases in mass, all without the use of large volumes of expensive resins. The present invention further provides a method for reinforcing existing structural parts without redesigning the geometry of the part or adding a laminate to the inside wall.

SUMMARY OF THE INVENTION

In one aspect the present invention provides a reinforcement web for a structural member. The reinforcement web has a rectangular plate having a pair of end portions and a mid portion. A layer of unexpanded expandable foam is disposed on one side of the end portions and one side of the mid portion. A thin metal sheet is disposed on the foam layer overlying the midportion of the rectangular plate. In one aspect the mid portion has a pair of opposed edges with flanges which project away from the surface of the rectangular plate.

In another aspect, the present invention provides a reinforced hollow member. The hollow member has a pair of partial webs separated by a space, each of the partial webs having a reinforcement web-receiving surface. A reinforcement web spans the space and is attached to each of the partial webs at the reinforcement web-receiving surfaces. The reinforcement web has a rectangular plate having a pair of end portions and a mid portion. A layer of expandable foam is disposed on one surface of the end portions and mid portion. A thin metal sheet is disposed on the foam layer overlying the mid portion with the metal sheet overlying the mid portion of the rectangular plate. The mid portion has a pair of opposed edges with flanges that project away from the surface of the rectangular plate at about a forty-five degree angle from the surface of the plate.

In still another aspect the present invention provides a method of reinforcing a structural member having a pair of spaced partial web sections. The method includes the steps of providing a reinforcement web for a structural member. The reinforcement web has a rectangular plate having a pair of end portions and a mid portion. A layer of expandable foam is placed on one surface of the end portions and a surface of the mid portion. A thin metal sheet is placed on the foam layer overlying the mid portion. The reinforcement web is placed in the space or gap between the partial webs of the structural member with the expandable foam layers of the end portions being in contact with the partial web sections and bonded thereto. The structure is then heated to expand the foam and create a structural reinforcement.

These and other advantages and objects of the present invention will now be more fully described with reference to the drawings.

A BRIEF DESCRIPTION OF THE DRAWINGS

FIG. 1 is an end elevational view of a vehicle structural member having partial webs;

FIGS. 2 and 3 are cross-sectional views taken through FIG. 1 along the lines 2—2 and 3—3, respectively;

FIG. 4 is a side elevational view partly broken away of a reinforcing laminate web insert in accordance with this invention;

FIG. 5 is a cross-sectional view taken through FIG. 4 along the line 5—5;

DETAILED DESCRIPTION

Figure 6:
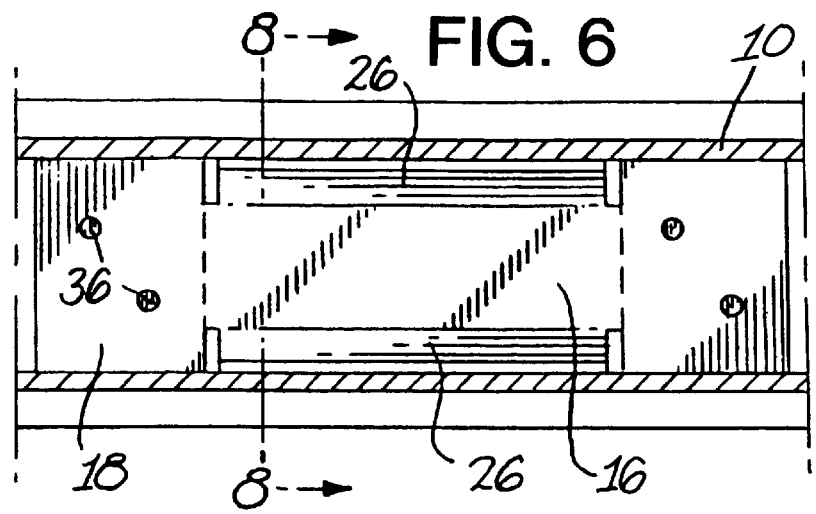
FIG. 6 is a side elevational view similar to FIG. 4 but showing the reinforcement unit mounted in place.

The present invention relates to providing a lightweight laminate reinforcing web stiffener which stiffens and strengthens a hollow built up cross-section by providing a drop in insert which may be a paint bake cured part particularly when used in the automotive industry. In a preferred practice of the invention the laminate comprises a thin metal sheet made from, for example, aluminum, having an expandable polymer layer to comprise a drop in insert. The sheet and polymer once cured form a lightweight stiffening web that prevents a section from losing its shape due to applied loads. The drop in lightweight reinforcing insert requires no welding due to the expandable polymer which functions as a structural adhesive and which is stiffer and stronger than a thin metal web that would buckle under an applied load.

FIGS. 1–3 illustrate a two piece structural member 10,10 which is to be reinforced with the laminate reinforcing web 12. The laminate reinforcing web 12 is best shown in FIGS. 4–5. As shown in FIGS. 1–3 a pair of partial webs or web sections 34 extend into the hollow space formed by structural member 10. These various structural member components are secured together at the flanges 32,32 of the structural member. The web portions 34 are spaced apart to form a gap 35. As later described, the reinforcing web or insert 12 will be located to bridge the gap and effectively secure the various components together while providing a reinforcement. As also later described holes 30 may be provided in web sections 34 to assure proper positioning and location of the reinforcing web 12 in the structural member.

As shown in FIGS. 4–5, the laminate reinforcing web 12 comprises a multi-piece drop in insert having a base or carrier member web 14 which has a mid portion 16 and two end portions 18,18. The end portions 18,18 may be separated from mid portion 14 by notches 20. A structural foam layer 22 is provided over each portion by either a continuous layer or three spaced layers covering the surface of web 14. A cover layer 24 is provided over the polymer structural foam layer 22. Preferably the cover layer 24 is located only at the mid portion 16. The sides of mid portion 16 are bent away from the principal surface of mid portion 16 to form flanges 26, while the sides of covering member 24 are bent in the opposite direction to form flanges 28. Notches 20 facilitate the bending of the flanges 26.

Figure 7:
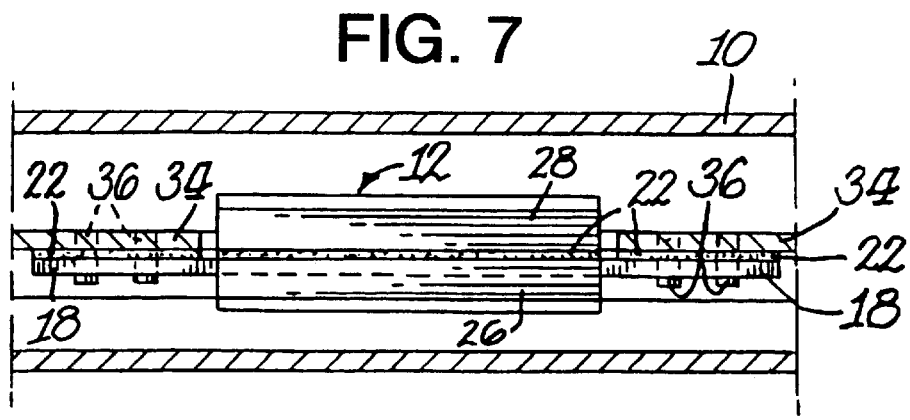
FIG. 7 is a top plan view of the structure shown in FIG. 6.

As shown in FIG. 4 openings 31 may be provided at suitable locations in web 14 such as in the end portions 18 for later alignment with openings 30 in web sections 34. Holes or openings 30 and 31 are located to accommodate the passage of pins 36 to assure proper initial positioning of the components, as shown in FIG. 7.

FIGS. 6–9 illustrate the drop in insert or reinforcing web 12 mounted in place within a structural member 10. As shown therein the end portions 18 are used to mount against web sections 34,34 by inserting push pins 36 through the foam layer 22 and the corresponding holes in end portions 18 and holes 30 in partial webs 34. The mid portion 16 of web 12 spans the open space or gap 35. Cover plate 24 functions to provide additional reinforcement in this open area. Because the foam layer 22 should make direct contact with the partial webs 34 the cover member 24 is not provided at the end portions 18. The flanges 26,26 and 28,28 at the mid portion of insert 12 are located to be juxtaposed the inner surfaces of structural members 10,10.

In practice the drop in insert or reinforcing web 12 would be inserted into the hollow space of one of the structural members 10. The web 12 is properly positioned by aligning holes 30 and 31 and then inserting the push pins 36 as previously described. Because of the tacky nature of the unexpanded foam layer the drop in insert could be disposed either on top of or alternatively below the partial webs 34. After the web is positioned within the one structural member, the other structural member may then be mounted in place and the structural members are secured together at their flanges 32,32. The polymer foam layer 22 is later expanded so as to create a structural foam and to intimately bond the various components together.

Figure 8:
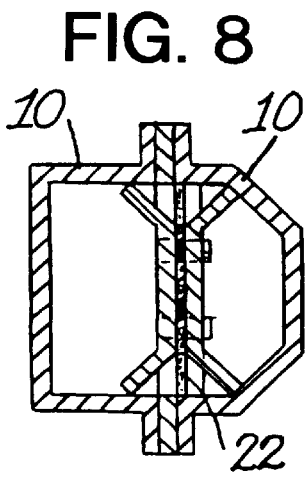
FIG. 8 is a cross-sectional view taken through FIG. 6 along the line 8—8.
Figure 9:
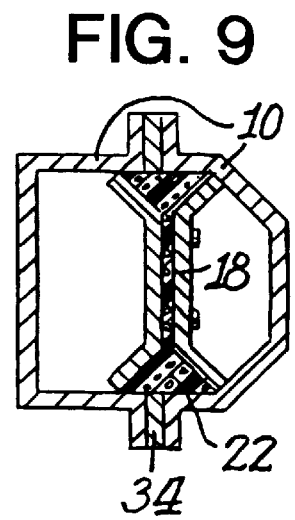
FIG. 9 is a view similar to FIG. 8 showing the foam in its expanded condition.

FIG. 8 illustrates the resultant assembly before the foam layer 22 is expanded. As shown therein the inclined flanges 26,26 and 28,28 are in contact with the inner surfaces of the structural members 10,10. Where the foam layer 22 is a heat expandable foam the foam is caused to expand during the normal assembly line processing of the structural member such as in a conventional paint oven generally used in automotive assembly lines. The heat expandable foam is thus actuated and expands outwardly where it is free to flow and make intimate contact with the carrier 14, cover member 24 and their flanges 26,28 and with the inner surfaces of the structural members 10,10 as shown in FIG. 9, as well as with the partial webs 34,34. The flanges thus function to form guide surfaces for permitting the foam to expand and to direct the foam into contact with the structural members. The foam then becomes intimately bonded with all of the members it contacts. As a result, the foam functions not only as a reinforcement, but also to tie together all of the components, namely the two structural members 10,10 and their partial webs 34,34 as well as the carrier 14 and cover member 24 of the drop in insert.

Various materials and dimensions may be used for practicing this invention as dictated by the intended end uses thereof. Carrier member 14 is preferably a thin metal sheet and more preferably an aluminum sheet which may be, for example, 0.010 inch thick. Although the drawings illustrate the end portions 18,18 to be of the same size, one end portion could be longer than the other. In one embodiment of the invention one end portion 18 could have a length of 8 inches and the opposite end portion 18 could have a length of 4 inches. The carrier 14 could have, for example, a width of 4 inches and the mid portion 16 could be 9 inches long, giving the carrier 14 an overall length of 21 inches. Reference is made to the above noted provisional application, all of the details of which are incorporated herein. The provisional application discloses specific dimensions, shapes and materials for use with the invention. Thus, as described therein, the foam layer 22 in its unexpanded condition may be 3/16 inches thick. The flanges 26 and 28 may be disposed at an angle between 30° and 60°, and preferably at a 45° angle. The holes 30 and 31 for the push pins may be, for example, 3/16 inch in diameter. Carrier member 14 and cover member 24 may be thin gauge metal such as aluminum or steel from about 0.003 to about 0.050 inches thick, or 0.005 to 0.028 inches thick.

The structural member can be, for example, an automotive rail or the like which typically would be formed of steel or aluminum. The structural member may also be a windshield pillar or a bulkhead carrier such as is located under the door of an automobile. These are simply exemplary parts for use with the invention. Carrier 14 is generally a flat plate which is rectangular in form with the end portions 18,18 flanking and possibly slightly indented from mid portion 16. The plate 14 would be sized to fit the structure to be reinforced but typically would have a length of about 10 inches to about 30 inches with a width of about 3 inches to about 6 inches.

The flanges 26,28 provide additional structural strength and produce a designed place for the polymer to expand and root into the top and bottom wall of the sections from structural member 10,10.

As shown in FIG. 7 the polymer layer 22 may be a discontinuous layer wherein the carrier 14 is free of polymer at the junction of the mid portion 16 and end portions 18,18. Alternatively a single continuous layer 22 could cover the entire carrier 14. In another alternative portions of carrier 14, such as the longitudinal edges could be free of polymer layer. The foam or polymer layer 22 is preferably from about 0.125 to about 0.25 inches thick and is preferably a resin based material which incorporates hollow glass microspheres to reduce density. The density of the material is preferably from about 20 to about 40 pounds per cubic feet to minimize weight. The melting point heat distortion temperature and the temperature at which chemical breakdown occurs must also be sufficiently high such that the foam 22 maintains its structure at high temperatures typically encountered in paint ovens and the like. Therefore the foam layer 22 should be able to withstand temperatures in excess of 125° C. and preferably 160° C. for short times. Reference is made to U.S. Pat. No. 5,575,526, all of the details of which are incorporated herein by reference thereto and which discloses suitable polymer foam materials including heat or thermally expandable foam. Reference is also made to copending application Ser. No. 08/914,481 filed Aug. 19, 1997, the details of which are incorporated herein by reference thereto. That application discloses suitable materials which may be used in the practice of the present invention. Although chemically actuated foams can be used, heat expandable foams are particularly advantageous in vehicle assembly lines since the expansion could result from subjecting the structural member with the foam on the insert 12 to heat in an oven such as by the conventional coating processes used in vehicle manufacturing. Thus, a separate heating step is not needed to expand the foam. It is to be understood, however, that while a heat expandable foam is preferred the invention may be practiced with other types of foam such as chemically activated foams. Thus, any suitable expandable foam material or resin foam may be used in the broad practice of this invention.

The foam layer 22 is preferably formed as preformed sheets which have sufficient tack to adhesively bond to carrier 14 and to cover 24 and partial webs 34. These sheets may be die cut or extruded. The sheets which overly the end portions 18,18 may be provided with holes to align with holes 30,31 to serve as locating holes to position plate 14 in the structural member 10 through the use of push pins or the like.

In order to provide maximum strength with minimum weight the present invention combines foam and lightweight metals. This concept is carried through in the web reinforcement by providing the thin metal sheet or cover 24 over the mid portion 16 and more particularly over the unexpanded foam 22 in the mid portion. The thin metal sheet 24 is preferably high strength steel or aluminum having a gauge of between about 0.028 and about 0.050. That is the thin metal sheet will preferably have a thickness of about 0.003 to about 0.015 inches and will generally cover the majority of the mid portion 16.

As shown in FIG. 3 and previously described, the structural member 10 includes partial webs 34,34 with an open gap 35 between the partial webs. The drop in insert 12 will be placed across the gap spanning the partial webs 34,34. End portions 18,18 will seat against partial webs 34,34 and will be held in position by push pins 36,36. The mid portion 16 of drop in insert 12 thus spans the gap. Foam layer 22 is located between partial webs 34 and end portions 18 as clearly shown in FIG. 7. Thus, the drop in insert 12 acts as a reinforcement which in essence serves as a splice between the partial webs 34,34 to create a full web spanning the structural member 10. As structural member 10 is heated, for example, as a motor vehicle moves through a paint oven, foam layer 22 expands by the action of the blowing agent. This expansion causes the foam layer 22 to fill any voids at joints of the like and to form a lightweight web which is stronger than a single thin metal plate.

The invention is particularly effective for use in providing a connection between a pair of webs which are spaced from each other by spanning the webs to effectively reinforce the structural member having the webs.

While the invention has been particularly described with respect to structural members which are automotive components the invention may be practiced with other structural members where it is desired to provide a reinforcement web that spans partial webs of a hollow structural member and stabilizes the walls of a cross section.

Figure 10:
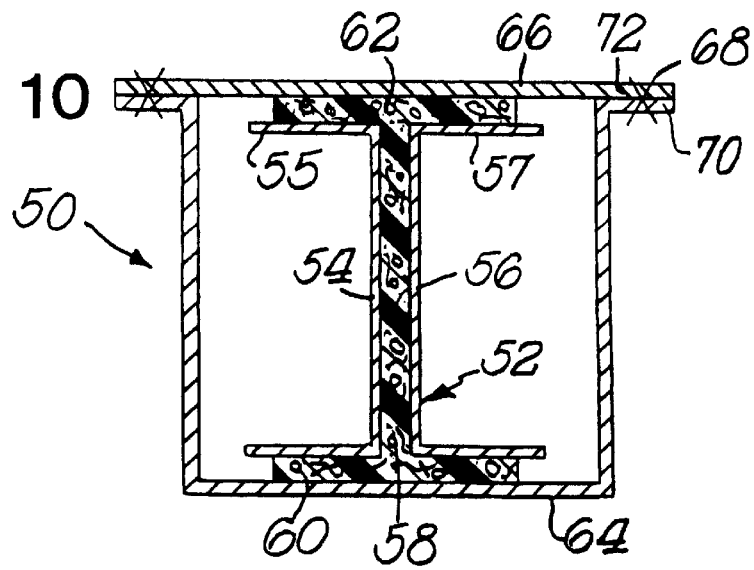
FIGS. 10–12 are views similar to FIG. 9 showing other variations of the invention.
Figure 11:
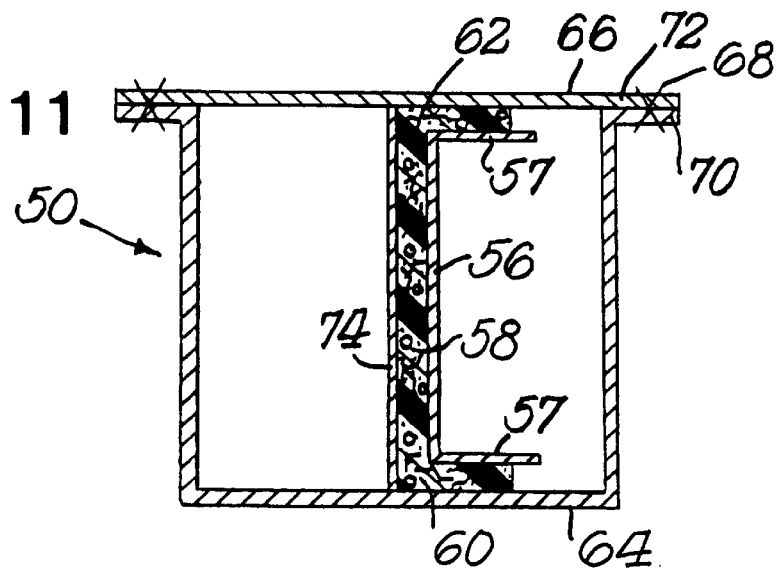
Figure 12:
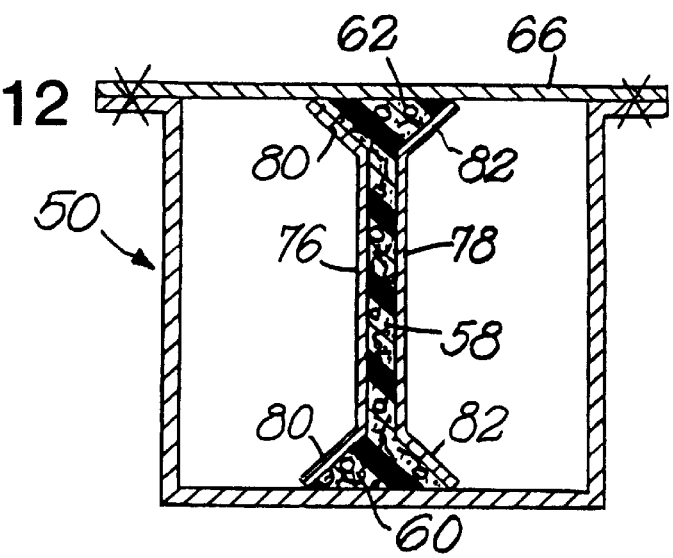

FIGS. 10–12 show alternative practices of the invention wherein various laminate bulkheads or webs are used in the practice of the invention after expansion of the foam. As shown in FIG. 10 a hollow structural member 50 having an open top is provided with a drop in insert 52 which comprises a pair of spaced metal U-shaped plates 54,56 which might be considered analogous to the carrier 14 and cover member 24 in the prior embodiment. Plates 54,56 have parallel mid portions and mirror image flanges 55,57. A layer of foam 58 is applied between the support members 54,56 with the layer exposed at its opposite end sections 60,62. End section 60 would be placed directly against the intermediate wall 64 of the structural member 50. After the drop in insert 52 is positioned in structural member 50 a cap or other structural member 66 is mounted across and closes the channel formed by structural member 60. The cap 66 is in direct contact with section 62 of foam 58 when the foam has expanded. Upon expansion the foam intimately bonds the cap 66 to the structural member 50 while providing a reinforcement for the structural member. If desired, further securing structure 68 such as welds could be provided at the outwardly extending flanges 70,72 of the structural member 50 and cap 66.

FIG. 11 illustrates a variation of the embodiment shown in FIG. 10 wherein the previously described support member 54 is replaced by a planar plate like support member 74.

In the embodiment of FIG. 12 the support members 76,78 are generally planar but then have outwardly extending mirror image flanges 80,82 so that the foam 58 is located between the support plates 76,78 and the flanges 80,82.

The embodiments of FIGS. 10–12 thus have in common that a carrier is provided on one side of the foam layer with the carrier having distinct end portions offset from the principal surface of the mid portion. A cover member is provided on the opposite side of the carrier to confine the foam layer therebetween. The combination exposes the foam layer at its two opposite end surfaces outwardly of the end portions of the carrier. Thus, in FIG. 10 the end portions would be the perpendicular walls 55 or 57. In FIG. 11 the end portions would be the perpendicular walls 57. In FIG. 12 the end portions would be the flanges 80 or 82.

The embodiments of FIGS. 10–12 thus show practices of the invention for reinforcing a structural member which does not include partial webs.

What is claimed is:

1. A reinforcement web for a hollow structural member, comprising a plate having a pair of end portions; said plate having a mid portion disposed between said end portions; said mid portion of said plate and said end portions each having a principal surface, said principal surfaces being coplanar; a layer of expandable foam disposed on said principal surface of each of said end portions; a layer of expandable foam disposed on said principal surface of said mid portion; at least a portion of said foam layer of said mid portion being discontinuous with respect to said foam layers of said end portions at the junction of each of said end portions with said mid portion; and a thin cover sheet disposed on said foam layer overlying said mid portion.

2. The reinforcement web for a structural member recited in claim 1, wherein said mid portion has a pair of opposed edges and wherein each of said edges has a flange projecting away from said principal surface.

3. The reinforcement web for a structural member recited in claim 1, wherein substantially the entirety of said principal surfaces of said end portions and said mid portion are covered with said expandable foam layer.

4. A reinforcement web for a hollow structural member, comprising a plate having a pair of end portions; said plate having a mid portion disposed between said end portions; said mid portion of said plate and said end portions each having a principal surface, said principal surfaces being coplanar; a layer of expandable foam disposed on said principal surface of each of said end portions; a layer of expandable foam disposed on said principal surface of said mid portion; a thin cover sheet disposed on said foam layer overlying said mid portion; said mid portion has a pair of opposed edges and wherein each of said edges has a flange projecting away from said principal surface; and said flanges project at about a forty five degree angle relative to an axis along said principal surface of said mid portion.

5. The reinforcement web for a structural member recited in claim 1, wherein said plate and said thin sheet are metal.

6. The reinforcement web for a structural member recited in claim 1, wherein said expandable foam is a resin-based material containing a blowing agent.

7. A reinforcement web for a hollow structural member, comprising a plate having a pair of end portions; said plate having a mid portion disposed between said end portions; said mid portion of said plate and said end portions each having a principal surface, said principal surfaces being coplanar; a layer of expandable foam disposed on said principal surface of each of said end portions; a layer of expandable foam disposed on said principal surface of said mid portion; a thin cover sheet disposed on said foam layer overlying said mid portion; and wherein said end portions and said expandable foam layer on said end portions have holes adapted to receive fasteners.

8. A reinforcement web for a hollow structural member, comprising a plate having a pair of end portions; said plate having a mid portion disposed between said end portions; said mid portion of said plate and said end portions each having a principal surface, said principal surfaces being coplanar; a layer of expandable foam disposed on said principal surface of each of said end portions; a layer of expandable foam disposed on said principal surface of said mid portion; a thin cover sheet disposed on said foam layer overlying said mid portion; and wherein said plate is rectangular, and said foam is discontinuous over said plate with the plate being free of said foam at the junction of said end portions and said mid portion.

9. The reinforcement web for a structural member recited in claim 2, wherein said cover sheet has opposed edges each of which terminate in a flange projecting away from said principal surface.

10. A reinforced hollow member, comprising a hollow member having a pair of partial webs separated by a space, each of said partial webs having a reinforcement web receiving surface; a reinforcement web spanning said space and being attached to each of said partial webs at said reinforcement web receiving surfaces; said reinforcement web having a plate having a pair of end portions; said plate having a mid portion disposed between said end portions; said mid portion of said plate and said end portions each having a principal surface, said principal surfaces being coplanar; a layer of structural foam disposed on said principal surface of each of said end portions and said structural foam of said end portions being in contact with said reinforcement web receiving surfaces of said partial webs; a layer of structural foam disposed on said principal surface of said mid portion;

and a thin sheet disposed on said structural foam layer overlying said mid portion.

11. The reinforced hollow member recited in claim 10, wherein said mid portion has a pair of opposed edges and wherein each of said edges has a flange projecting away from said principal surface.

12. The reinforced hollow member recited in claim 11, wherein said flanges project at about a forty five degree angle relative to an axis along said principal surface of said mid portion.

13. The reinforced hollow member recited in claim 10, wherein substantially the entirety of said principal surfaces are covered with said expandable foam layer.

14. The reinforced hollow member recited in claim 10, wherein said plate and said thin sheet are metal, and said plate is rectangular.

15. The reinforcement hollow member recited in claim 10, wherein said foam is resin-based material containing a blowing agent.

16. The reinforcement web for a structural member recited in claim 8 wherein said end portions and said expandable foam layers on said end portions have holes adapted to receive fasteners.

17. A method of reinforcing a structural member having a pair of spaced partial web sections, comprising the steps of providing a reinforcement web for a structural member; said reinforcement web having a plate with a pair of end portions; said plate having a mid portion disposed between said end portions; said mid portion of said plate and said end portions each having a principal surface, said principal surfaces being coplanar; a layer of expandable foam being disposed on said principal surface of each of said end portions; a layer of expandable foam being disposed on said principal surface of said mid portion; and a thin sheet disposed on said foam layer overlying said mid portion; placing said reinforcement web in said space with said expandable foam layers of said end portions being in contact with said partial web sections and bonded thereto; heating said expandable foam to create a structural foam.

18. The method of reinforcing a structural member recited in claim 17, wherein said mid portion has a pair of opposed edges and wherein each of said edges has a flange projecting away from said principal surface.

19. The method of reinforcing a structural member recited in claim 18, wherein said thin sheet has a pair of opposed edges, each of which has a flange projecting away from said principal surface in a direction opposite said flanges of said mid portion.

20. The method of reinforcing a structural member recited in claim 17, wherein substantially the entirety of said principal surfaces are covered with said expandable foam layer.

21. The method of reinforcing a structural member recited in claim 19, wherein said flanges project at about a forty five degree angle relative to an axis along said principal surface of said mid portion.

22. The method of reinforcing a structural member recited in claim 17, wherein said plate and said thin sheet are metal, and said plate is rectangular.

23. The method of reinforcing a structural member recited in claim 17, wherein said expandable foam is a resin-based material containing a blowing agent.

24. The method of reinforcing a structural member recited in claim 17, wherein said end portions and said expandable foam layer on said end portions have holes adapted to receive fasteners.

25. A reinforced structural assembly comprising a hollow structural member having a channel shape with an open top and an opposed end remote from and opposite to said open top, a reinforcement insert in the channel of said structural member, said reinforcement insert comprising a carrier having a principal surface, said carrier having end portions offset and disposed away from said principal surface at opposite edges of said principal surface, a layer of expandable structural foam on said principal surface and said end portions of said carrier, a cover member on said layer of foam parallel to said principal surface, a cap over said open end of said channel, and said foam being located to make intimate contact with said cap and said remote end of said structural member when said foam is expanded whereby said foam is intimately bonded to said cap and said structural member and said carrier and said cover member to provide a reinforcement therefore.

26. The structural assembly recited in claim 25 wherein said cover member includes end portions which extend away from said principal surface in a direction opposite to said end portions of said carrier as mirror images of said end portions of said carrier, and said foam being on said end portions of said cover member.

27. The structural assembly recited in claim 26 wherein said end portions of said carrier and of said cover member are generally perpendicular to said principal surface.

28. The structural assembly recited in claim 26 wherein said end portions of said carrier and said cover member are disposed at an angle between 30° and 60° with respect to said principal surface.

29. The structural assembly recited in claim 25 wherein said end portions of said carrier are generally perpendicular to said principal surface, and said cover member lies only in a plane parallel to said principal surface.

30. The reinforced hollow member of claim 10 wherein said thin sheet is confined to said mid portion, said end portions having holes, and fasteners received in said holes.

31. The reinforcement web for a structural member recited in claim 1, wherein a pair of aligned notches are at each of said junctions between said end portions and said mid portion to cause said foam layer to be discontinuous.

* * * * *